United States Patent
Koo et al.

(10) Patent No.: US 11,681,085 B2
(45) Date of Patent: Jun. 20, 2023

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Jun Mo Koo, Suwon-si (KR); Bong Choon Kim, Suwon-si (KR); Dong Yoon Shin, Suwon-si (KR); Jung Hun You, Suwon-si (KR); Sang Hum Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 367 days.

(21) Appl. No.: 16/941,252

(22) Filed: Jul. 28, 2020

(65) Prior Publication Data
US 2021/0033768 A1 Feb. 4, 2021

(30) Foreign Application Priority Data
Jul. 30, 2019 (KR) .................. 10-2019-0092751

(51) Int. Cl.
*G02B 5/30* (2006.01)
(52) U.S. Cl.
CPC ......... *G02B 5/3083* (2013.01); *G02B 5/3041* (2013.01)
(58) Field of Classification Search
None
See application file for complete search history.

(56) References Cited

U.S. PATENT DOCUMENTS

2006/0274229 A1 12/2006 Ito et al.
2014/0168579 A1* 6/2014 Kim .................. G02B 1/14
                                                    359/489.07
(Continued)

FOREIGN PATENT DOCUMENTS

CN    101959950 A    1/2011
CN    104133321 A    11/2014
(Continued)

OTHER PUBLICATIONS

Taiwan Office Action in corresponding Taiwan Application No. 109125619, Taiwan Office Action dated Sep. 8, 2021 (11 pgs.).
(Continued)

*Primary Examiner* — Richard H Kim
(74) *Attorney, Agent, or Firm* — Lewis Roca Rothgerber Christie LLP (57) ABSTRACT

A polarizing plate and an optical display apparatus are provided. A polarizing plate includes: a polarizer; and a first retardation layer and a second retardation layer sequentially stacked on a lower surface of the polarizer, and the first retardation layer has a short wavelength dispersion of about 1 to about 1.03, a long wavelength dispersion of about 0.98 to about 1, and an in-plane retardation of about 180 nm to about 220 nm at a wavelength of 550 nm, the second retardation layer has a short wavelength dispersion of about 1 to about 1.1, a long wavelength dispersion of about 0.96 to about 1, and an in-plane retardation Re of about 70 nm to about 120 nm at a wavelength of 550 nm, and a ratio of out-of-plane retardation of the second retardation layer at a wavelength of 550 nm to thickness thereof is about −33 nm/μm to about −15 nm/μm.

19 Claims, 1 Drawing Sheet

(56) References Cited

U.S. PATENT DOCUMENTS

2015/0002010 A1* 1/2015 Lee .................. G02B 5/3025
359/489.07
2018/0095211 A1* 4/2018 Lee .................. G02B 5/3041

FOREIGN PATENT DOCUMENTS

| | | | |
|---|---|---|---|
| CN | 104252016 | A | 12/2014 |
| CN | 107884863 | A | 4/2018 |
| CN | 109791242 | A | 5/2019 |
| JP | 2013-164525 | A | 8/2013 |
| KR | 10-2013-0103595 | A | 9/2013 |
| KR | 10-2014-0094391 | A | 7/2014 |
| TW | 201447397 | A | 12/2014 |
| TW | 201504695 | A | 2/2015 |

OTHER PUBLICATIONS

China Office Action in corresponding Chinese Patent Application No. 202010749929.X, Chinese Office Action dated Feb. 23, 2022 (9 pgs.).

* cited by examiner

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2019-0092751, filed on Jul. 30, 2019 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

An organic light emitting diode display can suffer from deterioration in visibility and contrast due to reflection of external light. In order to solve or mitigate such a problem, a polarizing plate including polarizers and a retardation film may be used to realize an anti-reflection function by preventing or substantially preventing reflected external light from leaking out.

A conventional retardation film is produced by stretching a non-stretched film in a machine direction or in a transverse direction so as to be attached to a polarizer by a roll-to-roll process. However, since an optimal angle is not obtained between the polarizer and the stretched film, the polarizing plate can have high reflectivity and may be difficult to use. In order to solve or mitigate this problem by adjusting an angle between a transmission axis of a polarizer and a slow axis of a retardation film, a roll of the retardation film may be unrolled, tilted at a certain angle, and cut before being attached to the polarizer, causing a large amount of waste of the retardation film. There has been proposed a method of fabricating a retardation film by stretching a conventional non-stretched film in an oblique direction. However, this method requires a thick film to meet a target retardation value and has difficulty in controlling uniformity in thickness over the entire width of the film.

Recently, with development of a material for retardation films, there has been developed a method of manufacturing a retardation film by coating a base film or a certain retardation film with liquid crystals. In this method, however, the retardation film requires an alignment film for orientation of the liquid crystals at a certain angle, causing generation of foreign matter. Further, the retardation film has problems of deterioration in UV resistance due to high absorption in the UV region due to composition characteristics of the liquid crystal, and requiring a separate adhesive due to low adhesion between the base film and the coating layer.

The background technique of the present invention is disclosed in Korean Patent Laid-open Publication No. 10-2013-0103595.

SUMMARY

According to an aspect of embodiments of the present invention, a polarizing plate that secures good effects in thickness reduction and has very low front reflectivity and lateral reflectivity is provided.

According to another aspect of embodiments of the present invention, a polarizing plate that has low front reflectivity and lateral reflectivity in any wavelength band is provided.

According to another aspect of embodiments of the present invention, a polarizing plate that has good light resistance reliability is provided.

According to another aspect of embodiments of the present invention, an optical display apparatus including the above-described polarizing plate is provided.

According to one or more embodiments of the present invention, a polarizing plate includes: a polarizer; and a first retardation layer and a second retardation layer sequentially stacked on a lower surface of the polarizer, wherein the first retardation layer has a short wavelength dispersion of about 1 to about 1.03, a long wavelength dispersion of about 0.98 to about 1, and an in-plane retardation of about 180 nm to about 220 nm at a wavelength of 550 nm, the second retardation layer has a short wavelength dispersion of about 1 to about 1.1, a long wavelength dispersion of about 0.96 to about 1, and an in-plane retardation Re of about 70 nm to about 120 nm at a wavelength of 550 nm, and a ratio (Rth/d) of out-of-plane retardation (Rth) (unit: nm) of the second retardation layer at a wavelength of 550 nm to thickness (d) (unit: μm) of the second retardation layer is from about −33 nm/μm to about −15 nm/μm.

The first retardation layer may be an obliquely stretched film, and the second retardation layer may be an obliquely stretched coating layer.

The second retardation layer may be directly formed on the first retardation layer.

The first retardation layer may have a slow axis tilted at an angle of about +65° to about +75° or at an angle of about −65° to about −75° with reference to a transmission axis of the polarizer.

The second retardation layer may have an out-of-plane retardation of about −150 nm to about −50 nm at a wavelength of 550 nm.

The second retardation layer may have a thickness of about 2 μm to about 8 μm.

An angle defined between a slow axis of the first retardation layer and a slow axis of the second retardation layer may be from about 55° to about 70°.

A ratio of short wavelength dispersion of the second retardation layer to short wavelength dispersion of the first retardation layer may be from about 1 to about 1.08.

A ratio of long wavelength dispersion of the second retardation layer to long wavelength dispersion of the first retardation layer may be from about 0.96 to about 1.

The first retardation layer may have a degree of biaxiality of about 1 to about 1.4 at a wavelength of 550 nm, and the second retardation layer may have a degree of biaxiality of about −2 to about 0 at a wavelength of 550 nm.

The second retardation layer may be a non-liquid crystal layer.

The second retardation layer may be formed of a second retardation layer composition including at least one of a cellulose ester and styrene, and each of the cellulose ester and the styrene may be substituted or unsubstituted with at least one of a halogen, a nitro group, an alkyl group, an alkenyl group, a cycloalkyl group, an aryl group, a heteroaryl group, an alkoxy group, and a halogen-containing functional group.

A laminate of the first retardation layer and the second retardation layer may have a variation in out-of-plane retardation (ΔRth) of about 10 nm or less, as calculated by the following Equation 1:

$$\Delta Rth = |Rth(0\ hr) - Rth(120\ hr)|,$$

where, in Equation 1, Rth(0 hr) denotes an absolute value (unit: nm) of initial Rth of the laminate of the first retardation layer and the second retardation layer at a wavelength of 550 nm, and Rth(120 hr) denotes an absolute value (unit: nm) of Rth of the laminate of the first retardation layer and the second retardation layer at a wavelength of 550 nm, as measured after irradiation of the laminate of the first retardation layer and the second retardation layer with light having a wavelength of 360 nm at a fluence of 720 mJ/cm² for 120 hours.

The second retardation layer may have a slow axis tilted at an angle of about +5° to about +10° or at an angle of about −5° to about −10° with reference to a transmission axis of the polarizer.

The polarizing plate may further include a primer layer formed on a lower surface of the first retardation layer.

The primer layer may include particles having an average particle diameter (D50) of about 1 nm to about 500 nm.

The particles may include at least one of silicon oxide and titanium oxide.

The polarizing plate may further include a protective film stacked on an upper surface of the polarizer.

The polarizing plate may further include a third retardation layer on the lower surface of the polarizer, wherein the third retardation layer includes a positive C retardation layer having an out-of-plane retardation of about −150 nm to about 0 nm at a wavelength of 550 nm.

According to an aspect of embodiments of the present invention, a polarizing plate that secures good effects in thickness reduction and has very low front reflectivity and lateral reflectivity is provided.

According to another aspect of embodiments of the present invention, a polarizing plate that has low front reflectivity and lateral reflectivity in any wavelength band is provided.

According to another aspect of embodiments of the present invention, a polarizing plate that has good light resistance reliability is provided.

According to another aspect of embodiments of the present invention, an optical display apparatus including a polarizing plate as described above is provided.

DETAILED DESCRIPTION

Some embodiments of the present invention will be described in further detail with reference to the accompanying drawings such that the present invention can be easily implemented by those skilled in the art. It is to be understood that the present invention may be embodied in many different ways and is not limited to the following embodiments. In the drawings, portions irrelevant to the description may be omitted for clarity. Like components are denoted by like reference numerals throughout the specification. Although lengths, thicknesses, or widths of various components may be exaggerated for understanding in the drawings, it is to be understood that the present invention is not limited thereto.

Herein, spatially relative terms, such as "upper" and "lower," are defined with reference to the accompanying drawings. Thus, it is to be understood that the term "upper surface" can be used interchangeably with the term "lower surface," for example.

Herein, "in-plane retardation Re," "out-of-plane retardation Rth," and "degree of biaxiality NZ" are represented by the following Equations A, B, and C, respectively:

$$Re = (nx-ny) \times d; \qquad \text{Equation A}$$

$$Rth = ((nx+ny)/2 - nz) \times d; \qquad \text{Equation B}$$

$$NZ = (nx-nz)/(nx-ny), \qquad \text{Equation C}$$

where, in Equations A to C, nx, ny, and nz are indexes of refraction of a corresponding optical device in the slow axis direction, the fast axis direction, and the thickness direction of the optical device at a measurement wavelength, respectively, and d is the thickness of the optical device (unit: nm). In Equations A to C, the measurement wavelength may be 450 nm, 550 nm, or 650 nm.

Herein, "short wavelength dispersion" refers to Re(450)/Re(550), and "long wavelength dispersion" refers to Re(650)/Re(550), wherein Re(450), Re(550), and Re(650) refer to in-plane retardation (Re) of a single retardation layer or a laminate of retardation layers at wavelengths of about 450 nm, 550 nm, and 650 nm, respectively.

As used herein to represent an angle, "+" means a clockwise direction about a reference point, and "−" means a counterclockwise direction about the reference point.

As used herein to represent a specific numerical range, the expression "X to Y" means "X≤ and ≤Y".

According to one or more embodiments of the present invention, a polarizing plate in which a first retardation layer having an in-plane retardation of about 180 nm to about 220 nm at a wavelength of 550 nm is stacked on a lower surface of a polarizer, and a second retardation layer having an in-plane retardation of about 70 nm to about 120 nm at a wavelength of 550 nm is directly stacked on a lower surface of the first retardation layer such that the first retardation layer and the second retardation layer are sequentially stacked on the lower surface of the polarizer is provided. As a result, the polarizing plate can allow reduction in thickness thereof, can reduce front reflectivity and lateral reflectivity for all wavelengths by reducing a difference in wavelength dispersion between the first retardation layer and the second retardation layer, and can have improved light resistance.

The polarizing plate according to one or more embodiments of the present invention includes the second retardation layer, which has a ratio (Rth/d) of out-of-plane retardation Rth (unit: nm) at a wavelength of 550 nm to thickness d (unit: μm) in a range from about −33 nm/μm to about −15 nm/μm, and is formed of a second retardation layer composition including at least one of cellulose ester polymers and polystyrene polymers described in further detail below. In an embodiment, the second retardation layer may be obliquely stretched.

Herein, a polarizing plate according to an embodiment of the present invention will be described with reference to FIG. 1.

Figure 1:
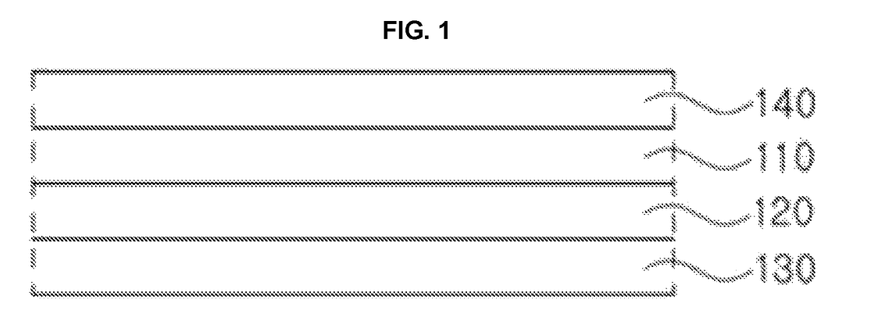
FIG. 1 is a cross-sectional view of a polarizing plate according to an embodiment of the present invention.

Referring to FIG. 1, a polarizing plate includes a polarizer 110, a protective film 140 stacked on an upper surface of the polarizer 110, and a first retardation layer 120 and a second retardation layer 130 sequentially stacked on a lower surface of the polarizer 110.

In an embodiment, the second retardation layer 130 may be directly formed on the first retardation layer 120. Herein, "directly formed on" means that no adhesive layer or bonding layer is present between the first retardation layer and the second retardation layer. However, it should be understood that the present invention does not exclude a structure in which the second retardation layer is formed on the first retardation layer via an adhesive layer or a bonding layer.

The first retardation layer 120 has positive wavelength dispersion, and may have a short wavelength dispersion of about 1 to about 1.03, a long wavelength dispersion of about 0.98 to about 1, and an in-plane retardation of about 180 nm to about 220 nm at a wavelength of 550 nm. Within these ranges, the first retardation layer can reduce front reflectivity and lateral reflectivity of the polarizing plate in use thereof.

In an embodiment, the first retardation layer 120 has a short wavelength dispersion of about 1 to about 1.02, a long wavelength dispersion of about 0.99 to about 1 or about 0.995 to about 1, and an in-plane retardation of about 180 nm to about 215 nm, and, in an embodiment, about 185 nm to about 215 nm, at a wavelength of 550 nm.

For example, the first retardation layer 120 may have a short wavelength dispersion of about 1, about 1.001, about 1.002, about 1.003, about 1.004, about 1.005, about 1.006, about 1.007, about 1.008, about 1.009, about 1.01, about 1.011, about 1.012, about 1.013, about 1.014, about 1.015, about 1.016, about 1.017, about 1.018, about 1.019, about 1.02, about 1.021, about 1.022, about 1.023, about 1.024, about 1.025, about 1.026, about 1.027, about 1.028, about 1.029, or about 1.03.

For example, the first retardation layer 120 may have a long wavelength dispersion of about 0.98, about 0.981, about 0.982, about 0.983, about 0.984, about 0.985, about 0.986, about 0.987, about 0.988, about 0.989, about 0.99, about 0.991, about 0.992, about 0.993, about 0.994, about 0.995, about 0.996, about 0.997, about 0.998, about 0.999, or about 1.

For example, the first retardation layer 120 may have an in-plane retardation of about 180 nm, about 181 nm, about 182 nm, about 183 nm, about 184 nm, about 185 nm, about 186 nm, about 187 nm, about 188 nm, about 189 nm, about 190 nm, about 191 nm, about 192 nm, about 193 nm, about 194 nm, about 195 nm, about 196 nm, about 197 nm, about 198 nm, about 199 nm, about 200 nm, about 201 nm, about 202 nm, about 203 nm, about 204 nm, about 205 nm, about 206 nm, about 207 nm, about 208 nm, about 209 nm, about 210 nm, about 211 nm, about 212 nm, about 213 nm, about 214 nm, about 215 nm, about 216 nm, about 217 nm, about 218 nm, about 219 nm, or about 220 nm, at a wavelength of 550 nm.

In an embodiment, the first retardation layer 120 may have an in-plane retardation of about 185 nm to about 227 nm, and, in an embodiment, about 180 nm to about 220 nm, and, in an embodiment, about 190 nm to about 210 nm, at a wavelength of 450 nm, and an in-plane retardation of about 180 nm to about 220 nm, and, in an embodiment, about 185 nm to about 217 nm, and, in an embodiment, about 190 nm to about 215 nm, at a wavelength of 650 nm. Within this range, the first retardation layer can easily achieve target short wavelength dispersion and long wavelength dispersion.

For example, the first retardation layer 120 may have an in-plane retardation of about 180 nm, about 181 nm, about 182 nm, about 183 nm, about 184 nm, about 185 nm, about 186 nm, about 187 nm, about 188 nm, about 189 nm, about 190 nm, about 191 nm, about 192 nm, about 193 nm, about 194 nm, about 195 nm, about 196 nm, about 197 nm, about 198 nm, about 199 nm, about 200 nm, about 201 nm, about 202 nm, about 203 nm, about 204 nm, about 205 nm, about 206 nm, about 207 nm, about 208 nm, about 209 nm, about 210 nm, about 211 nm, about 212 nm, about 213 nm, about 214 nm, about 215 nm, about 216 nm, about 217 nm, about 218 nm, about 219 nm, about 220 nm, about 221 nm, about 222 nm, about 223 nm, about 224 nm, about 225 nm, about 226 nm, or about 227 nm, at a wavelength of 450 nm.

For example, the first retardation layer 120 may have an in-plane retardation of about 180 nm, about 181 nm, about 182 nm, about 183 nm, about 184 nm, about 185 nm, about 186 nm, about 187 nm, about 188 nm, about 189 nm, about 190 nm, about 191 nm, about 192 nm, about 193 nm, about 194 nm, about 195 nm, about 196 nm, about 197 nm, about 198 nm, about 199 nm, about 200 nm, about 201 nm, about 202 nm, about 203 nm, about 204 nm, about 205 nm, about 206 nm, about 207 nm, about 208 nm, about 209 nm, about 210 nm, about 211 nm, about 212 nm, about 213 nm, about 214 nm, about 215 nm, about 216 nm, about 217 nm, about 218 nm, about 219 nm, or about 220 nm, at a wavelength of 650 nm.

In an embodiment, the first retardation layer 120 may have an out-of-plane retardation of about 90 nm to about 200 nm, and, in an embodiment, about 100 nm to about 160 nm, at a wavelength of 550 nm. Within this range, the polarizing plate can reduce lateral reflectivity. For example, first retardation layer 120 may have an out-of-plane retardation of about 90 nm, about 95 nm, about 100 nm, about 105 nm, about 110 nm, about 115 nm, about 120 nm, about 125 nm, about 130 nm, about 135 nm, about 140 nm, about 145 nm, about 150 nm, about 155 nm, about 160 nm, about 165 nm, about 170 nm, about 175 nm, about 180 nm, about 185 nm, about 190 nm, about 195 nm, or about 200 nm, at a wavelength of 550 nm.

In an embodiment, the first retardation layer 120 may have a degree of biaxiality of about 1 to about 1.4, and, in an embodiment, about 1 to about 1.3, at a wavelength of 550 nm. Within this range, the polarizing plate can reduce lateral reflectivity. For example, the first retardation layer 120 may have a degree of biaxiality of about 1, about 1.01, about 1.02, about 1.03, about 1.04, about 1.05, about 1.06, about 1.07, about 1.08, about 1.09, about 1.1, about 1.11, about 1.12, about 1.13, about 1.14, about 1.15, about 1.16, about 1.17, about 1.18, about 1.19, about 1.2, about 1.21, about 1.22, about 1.23, about 1.24, about 1.25, about 1.26, about 1.27, about 1.28, about 1.29, about 1.3, about 1.31, about 1.32, about 1.33, about 1.34, about 1.35, about 1.36, about 1.37, about 1.38, about 1.39, or about 1.4, at a wavelength of 550 nm.

In an embodiment, the first retardation layer 120 may include a film formed of an optically clear resin. For example, the first retardation layer 120 may include at least one resin selected from among cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, in order to secure short wavelength dispersion and long wavelength dispersion, the first retardation layer 120 may include a cyclic polyolefin resin. The cyclic polyolefin resin film can improve front reflectivity of the polarizing plate.

In an embodiment, the first retardation layer 120 may have a thickness of about 10 μm to about 60 μm, and, in an embodiment, about 20 μm to about 50 μm. Within this range, the first retardation layer 120 can be used in the polarizing plate. For example, the first retardation layer 120 may have a thickness of about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, or about 60 μm.

In an embodiment, the first retardation layer 120 may be formed by stretching a non-stretched film formed of the optically clear resin and may be stacked on the polarizer by a roll-to-roll process in manufacturing of the polarizing plate, thereby improving processability.

In an embodiment, the first retardation layer 120 is an obliquely stretched film formed by obliquely stretching a non-stretched film at an angle (e.g., a predetermined angle) with respect to a machine direction of the non-stretched film to ensure that the film has a slow axis tilted with respect to the machine direction. Here, oblique stretching may be performed by a typical method known in the art.

In an embodiment, the first retardation layer 120 may have a slow axis tilted at an angle of about +65° to about +75° or at an angle of about −65° to about −75° with reference to a transmission axis of the polarizer. Within this range of the tilt angle of the slow axis, the first retardation layer 120 can be within a preset range of angle with respect to the slow axis of the second retardation layer, thereby reducing reflectivity both at a front side and at a lateral side of the polarizing plate. In an embodiment, the slow axis of the first retardation layer is tilted at an angle of about +66° to about +73°, or about −66° to about −73°, and, in an embodiment, about +68° to about +71°, or about −68° to about −71°. For example, the slow axis of the first retardation layer 120 may be tilted at an angle of about +65°, about +66°, about +67°, about +68°, about +69°, about +70°, about +71°, about +72°, about +73°, about +74°, or about +75°, or about −75°, about −74°, about −73°, about −72°, about −71°, about −70°, about −69°, about −68°, about −67°, about −66°, or about −65°, with reference to the transmission axis of the polarizer 110.

In an embodiment, although not shown in FIG. 1, the first retardation layer 120 may be adhesively attached to the polarizer 110 via an adhesive layer. The adhesive layer may be formed of at least one selected from among, for example, a photocurable adhesive and a pressure sensitive adhesive (PSA), without being limited thereto.

The first retardation layer 120 cooperates with the second retardation layer 130 to reduce reflectivity at the front and lateral sides of the polarizing plate through improvement in degree of circular polarization by converting linearly polarized light into circularly polarized light at each wavelength. In an embodiment, the polarizing plate may have a degree of circular polarization of greater than about 65%, and, in an embodiment, about 70% to about 100%, at a lateral side of, for example, 60°. Within this range, it is possible to achieve advantageous effects of the present invention.

As described above, the second retardation layer 130 may be formed by coating a second retardation layer composition onto the first retardation layer 120 to form a coating layer, followed by oblique stretching together with the first retardation layer. In oblique stretching, the second retardation layer 130 may have a slow axis tilted at an angle of about +5° to about +10° or about −5° to about −10° with reference to the transmission axis of the polarizer 110. On the other hand, when there is a large difference in wavelength dispersion between the first retardation layer and the second retardation layer, the polarizing plate can suffer from deterioration in degree of circular polarization (ratio of polarization from linearly polarized light into circularly polarized light after passing through two layers) at each wavelength, causing deterioration in anti-reflection performance. In a structure in which the second retardation layer 130 is stacked on the first retardation layer 120 without an adhesive layer or a bonding layer therebetween, the polarizing plate can achieve significant enhancement in anti-reflection performance at each wavelength through maximization or increasing of the degree of circular polarization at each wavelength and can enhance processability in manufacturing of the polarizing plate through a roll-to-roll process by adjusting the ratio of out-of-plane retardation of the second retardation layer 130 at a wavelength of 550 nm to the thickness thereof to be in a particular range and controlling the tilt angle of the slow axis of the second retardation layer to 130 be within the range of about +5° to about +10° or within the range of about −5° to about −10° with reference to the transmission axis of the polarizer 110.

In an embodiment, a ratio of short wavelength dispersion between the first retardation layer 120 and the second retardation layer 130 [a ratio of short wavelength dispersion of the second retardation layer to short wavelength dispersion of the first retardation layer (short wavelength dispersion of second retardation layer)/(short wavelength dispersion of first retardation layer)] may be in a range from about 1 to about 1.08, and, in an embodiment, about 1 to about 1.07. Within this range, the polarizing plate can reduce reflectivity at each wavelength. For example, the ratio of short wavelength dispersion between the first retardation layer 120 and the second retardation layer 130 may be about 1, 1.01, 1.02, 1.03, 1.04, 1.05, 1.06, 1.07, or 1.08.

In an embodiment, a ratio of long wavelength dispersion between the first retardation layer and the second retardation layer [a ratio of long wavelength dispersion of the second retardation layer to long wavelength dispersion of the first retardation layer (long wavelength dispersion of second retardation layer)/(long wavelength dispersion of first retardation layer)] may be in a range from about 0.96 to about 1 or from about 0.97 to about 1. Within this range, the polarizing plate can reduce reflectivity at each wavelength. For example, the ratio of long wavelength dispersion between the first retardation layer and the second retardation layer may be about 0.96, 0.97, 0.98, 0.99, or 1.

The second retardation layer 130 may be formed by coating the second retardation layer composition onto a lower surface of the first retardation layer 120 to form a coating layer, which in turn is subjected to oblique stretching, as described above. Accordingly, the second retardation layer 130 can have a reduced thickness.

In an embodiment, the second retardation layer 130 may have a thickness of about 2 μm to about 8 μm, and, in an embodiment, about 3 μm to about 7 μm, and, in an embodiment, about 3.5 μm to about 6 μm. Within this range, the second retardation layer 130 can secure uniform out-ofplane retardation over the entire width thereof while allowing reduction in thickness of the polarizing plate.

For example, the second retardation layer may have a thickness of about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, or about 8 μm.

In an embodiment, as described above, the second retardation layer 130 may have Rth/d of about −33 μm/nm to about −15 μm/nm, and, in an embodiment, about −30 μm/nm to about −15 μm/nm, and, in an embodiment, about −30 μm/nm to about −17 μm/nm. Within this range, in the structure in which the second retardation layer 130 is directly formed on the first retardation layer 120 without an adhesive layer or a bonding layer interposed therebetween, the second retardation layer 130 can provide high lateral circular polarization in combination with the first retardation layer 120, thereby improving anti-reflection performance.

For example, the second retardation layer 130 may have Rth/d of about −33 μm/nm, about −32 μm/nm, about −31 μm/nm, about −30 μm/nm, about −29 μm/nm, about −28 μm/nm, about −27 μm/nm, about −26 μm/nm, about −25 μm/nm, about −24 μm/nm, about −23 μm/nm, about −22 μm/nm, about −21 μm/nm, about −20 μm/nm, about −19 μm/nm, about −18 μm/nm, about −17 μm/nm, about −16 μm/nm, or about −15 μm/nm.

With this structure, the second retardation layer 130 has positive wavelength dispersion and may have a short wavelength dispersion of about 1 to about 1.1 and a long wavelength dispersion of about 0.96 to about 1. Within this range, the second retardation layer 130 can reduce difference in wavelength dispersion with respect to the first retardation layer 120 and improves circular polarization at each wavelength, thereby improving anti-reflection performance of the polarizing plate.

For example, the second retardation layer 130 may have a short wavelength dispersion of about 1, about 1.01, about 1.02, about 1.03, about 1.04, about 1.05, about 1.06, about 1.07, about 1.08, about 1.09, or about 1.1. For example, the second retardation layer 130 may have a long wavelength dispersion of about 0.96, about 0.97, about 0.98, about 0.99, or about 1.

In an embodiment, the second retardation layer 130 may have a slow axis tilted at an angle of about +5° to about +10°, or about −5° to about −10°, with reference to the transmittance angle of the polarizer 110. Within this range, the slow axis of the second retardation layer 130 can be within a preset range of angle with respect to the slow axis of the first retardation layer 120 even after oblique stretching, thereby reducing reflectivity through improvement in degree of lateral circular polarization. In an embodiment, the tilt angle is in a range from about +6.5° to about +7.5°, or from about −6.5° to about −7.5°.

For example, the second retardation layer 130 may have a slow axis tilted at an angle of about +5°, about +5.5°, about +6°, about +6.5°, about +7°, about +7.5°, about +8°, about +8.5°, about +9°, about +9.5°, or about +10°, or at an angle of about −5°, about −5.5°, about −6°, about −6.5°, about −7°, about −7.5°, about −8°, about −8.5°, about −9°, about −9.5°, or about −10°, with reference to the transmittance angle of the polarizer 110.

The second retardation layer 130 may have an out-of-plane retardation of about −150 nm to about −50 nm, and, in an embodiment, about −130 nm to about −50 nm, and, in an embodiment, about −130 nm to about −70 nm, at a wavelength of 550 nm. Within this range, the second retardation layer 130 can improve the degree of lateral circular polarization, thereby improving lateral anti-reflectivity. For example, the second retardation layer 130 may have an out-of-plane retardation of about −150 nm, about −145 nm, about −140 nm, about −135 nm, about −130 nm, about −125 nm, about −120 nm, about −115 nm, about −110 nm, about −105 nm, about −100 nm, about −95 nm, about −90 nm, about −85 nm, about −80 nm, about −75 nm, about −70 nm, about −65 nm, about −60 nm, about −55 nm, or about −50 nm, at a wavelength of 550 nm.

In an embodiment, an angle defined between the slow axis of the first retardation layer 120 and the slow axis of the second retardation layer 130 may be in a range from about 55° to about 70°, and, in an embodiment, about 58° to about 70°, or about 60° to about 70°, and, in an embodiment, about 60° to about 67°. Within this range, the polarizing plate can achieve improvement in front circular polarization. For example, the angle may be about 55°, about 56°, about 57°, about 58°, about 59°, about 60°, about 61°, about 62°, about 63°, about 64°, about 65°, about 66°, about 67°, about 68°, about 69°, or about 70°.

Figure 2:
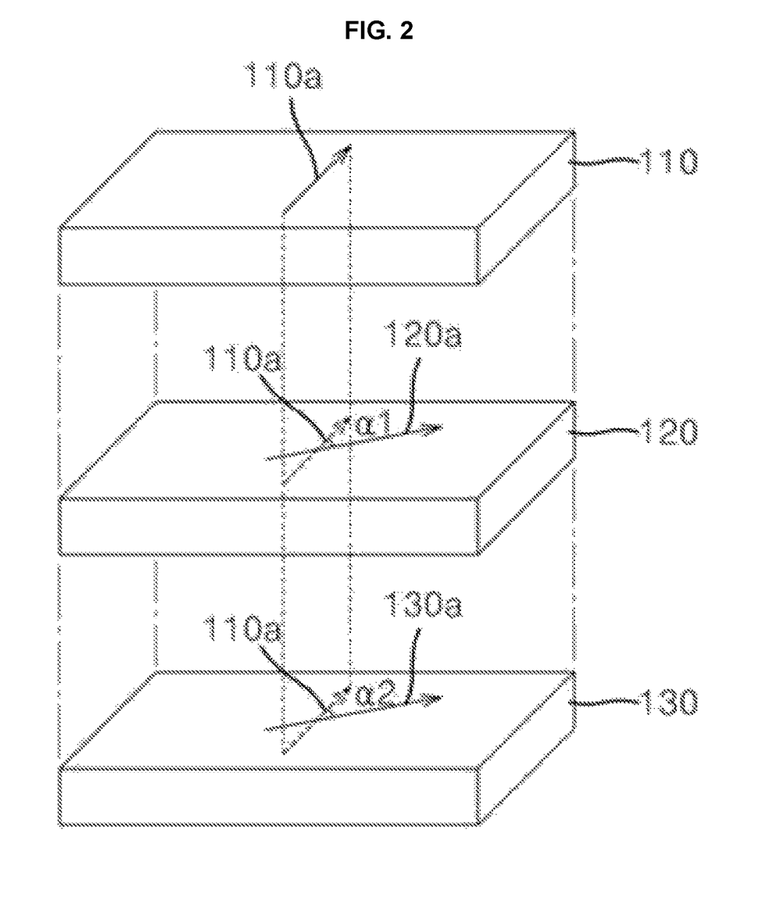
FIG. 2 is a view illustrating arrangement relations between a transmission axis of a polarizer, a slow axis of a first retardation layer, and a slow axis of a second retardation layer in a polarizing plate according to an embodiment of the present invention.

FIG. 2 is a view illustrating relations between the transmission axis of the polarizer, the slow axis of the first retardation layer, and the slow axis of the second retardation layer in a polarizing plate according to an embodiment of the present invention.

Referring to FIG. 2, the first retardation layer 120 may have a slow axis 120a tilted at an angle α1 of about +65° to about +75°, or about −75° to about −65°, with reference to a transmission axis 110a of the polarizer 110, and the second retardation layer 130 may have a slow axis 130a tilted at an angle α2 of about +5° to about +10°, or about −10° to about −5°, with reference to the transmission axis 110a of the polarizer 110. For example, the angle α1 may be about +65°, about +66°, about +67°, about +68°, about +69°, about +70°, about +71°, about +72°, about +73°, about +74°, or about +75°, or may be about −75°, about −74°, about −73°, about −72°, about −71°, about −70°, about −69°, about −68°, about −67°, about −66°, or about −65°. For example, the angle α2 may be about +5°, about +6°, about +7°, about +8°, about +9°, or about +10°, or may be about −10°, about −9°, about −8°, about −7°, about −6°, or about −5°.

In an embodiment, the second retardation layer 130 may have an in-plane retardation of about 70 nm to about 120 nm, and, in an embodiment, about 80 nm to about 110 nm, at a wavelength of 550 nm. Within this range, the second retardation layer 130 can improve antireflection performance in combination with the first retardation layer 120. For example, the second retardation layer 130 may have an in-plane retardation of about 70 nm, about 75 nm, about 80 nm, about 85 nm, about 90 nm, about 95 nm, about 100 nm, about 105 nm, about 110 nm, about 115 nm, or about 120 nm, at a wavelength of 550 nm.

In an embodiment, the second retardation layer 130 may have a degree of biaxiality of about −2 to about 0, and, in an embodiment, about −1 to about 0, at a wavelength of 550 nm. Within this range, the second retardation layer 130 can improve the degree of lateral circular polarization, thereby reducing lateral reflectivity. For example, the second retardation layer 130 may have a degree of biaxiality of about −2, about −1.9, about −1.8, about −1.7, about −1.6, about −1.5, about −1.4, about −1.3, about −1.2, about −1.1, about −1, about −0.9, about −0.8, about −0.7, about −0.6, about −0.5, about −0.4, about −0.3, about −0.2, about −0.1, or about 0, at a wavelength of 550 nm.

In an embodiment, the second retardation layer 130 may have an index of refraction of about 1.4 to about 1.6, and, in an embodiment, about 1.45 to about 1.58. Within this range, the second retardation layer 130 can control the index of refraction with respect to the first retardation layer 120, thereby improving transparency. For example, the second retardation layer 130 may have an index of refraction of about 1.4, about 1.41, about 1.42, about 1.43, about 1.44, about 1.45, about 1.46, about 1.47, about 1.48, about 1.49, about 1.5, about 1.51, about 1.52, about 1.53, about 1.54, about 1.55, about 1.56, about 1.57, about 1.58, about 1.59, or about 1.6.

In an embodiment, the second retardation layer 130 may be formed by coating a second retardation layer composition to a thickness (e.g., a predetermined thickness) on a surface of the first retardation layer 120, and drying and/or curing the second retardation layer 130 to form a coating layer, followed by oblique stretching the entirety of the first retardation layer 120 and the coating layer.

Next, the second retardation layer composition will be described.

The second retardation layer may be a non-liquid crystal layer. When the second retardation layer is formed of liquid crystals, the polarizing plate requires an alignment layer for alignment of the liquid crystals at a constant angle and can suffer from generation of foreign matter.

For formation of a non-liquid crystal coating layer, the second retardation layer composition may include at least one of a cellulose ester and styrene (or polystyrene), and each of the cellulose ester and the styrene may be substituted or unsubstituted with at least one of a halogen, a nitro group, an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ aryl group), an alkoxy group (for example, a $C_1$ to $C_{20}$ alkoxy group), and a halogen-containing functional group. Each of the cellulose ester and the styrene may be a monomer, an oligomer, or a polymer. Here, "alkyl," "alkenyl," "cycloalkyl," "aryl," "heteroaryl," and "alkoxy" are non-halogen groups free from a halogen atom for convenience.

The second retardation layer composition may include the cellulose ester alone, the styrene alone, or mixtures of the cellulose ester and the styrene.

Here, the "halogen" refers to F, Cl, Br, or I, and, in an embodiment, F.

Here, the "halogen-containing functional group" refers to an organic functional group containing at least one halogen and may include an aromatic functional group, an aliphatic functional group, or an alicyclic functional group. For example, the halogen-containing functional group may refer to a halogen-substituted $C_1$ to $C_{20}$ alkyl group, a halogen-substituted $C_2$ to $C_{20}$ alkenyl group, a halogen-substituted $C_1$ to $C_{20}$ alkenyl group, a halogen-substituted $C_3$ to $C_{10}$ cycloalkyl group, a halogen-substituted $C_1$ to $C_{20}$ alkoxy group, a halogen-substituted $C_1$ to $C_{20}$ acyl group, a halogen-substituted $C_6$ to $C_{20}$ aryl group, or a halogen-substituted $C_7$ to $C_{20}$ arylalkyl group, without being limited thereto.

In an embodiment, the cellulose ester may include at least one of cellulose acetate, cellulose acetate propionate, and cellulose acetate butyrate, without being limited thereto.

The cellulose ester and the styrene may be prepared by typical method known to those skilled in the art or may be selected from commercially available products in manufacturing of the second retardation layer 130.

In an embodiment, the second retardation layer composition includes at least of a halogen-substituted cellulose ester, a halogen-substituted styrene, a halogen functional group-substituted cellulose ester, and a halogen functional group-substituted styrene. With this second retardation layer composition, the polarizing plate can achieve improvement in light resistance reliability.

In an embodiment, for light resistance reliability, a laminate of the first retardation layer 120 and the second retardation layer 130 may have a variation in out-of-plane retardation (ΔRth) of about 10 nm or less, and, in an embodiment, about 0 nm to about 10 nm, as calculated by the following Equation 1:

$$\Delta Rth = |Rth(0 \text{ hr}) - Rth(120 \text{ hr})|, \quad \text{Equation 1}$$

where, in Equation 1, Rth(0 hr) denotes an absolute value (unit: nm) of initial Rth of the laminate of the first retardation layer and the second retardation layer at a wavelength of 550 nm; and Rth(120 hr) denotes an absolute value (unit: nm) of Rth of the laminate of the first retardation layer and the second retardation layer at a wavelength of 550 nm, as measured after irradiation of the laminate of the first retardation layer and the second retardation layer with light having a wavelength of 360 nm at a dose of 720 mJ/cm² for 120 hours.

For example, the laminate may have a variation in out-of-plane retardation (ΔRth) of about 0 nm, about 1 nm, about 2 nm, about 3 nm, about 4 nm, about 5 nm, about 6 nm, about 7 nm, about 8 nm, about 9 nm, or about 10 nm.

In Equation 1, the "laminate of the first retardation layer and the second retardation layer" may include not only a laminate of the first retardation layer and the second retardation layer directly formed thereon, but also a laminate of the first retardation layer, a primer layer, and the second retardation layer sequentially stacked in the stated order.

The second retardation layer composition may further include at least one additive selected from among an anti-blocking agent, an antistatic agent, a colorant, such as a pigment and the like, and a dispersion agent, without being limited thereto.

In an embodiment, the second retardation layer composition may be free from an aromatic additive including naphthyl benzoate and the like.

The polarizer 110 serves to convert natural light or polarized light into polarized light through linear polarization in a direction (e.g., a predetermined direction) and may be produced from a polymer film essentially containing a polyvinyl alcohol resin. In an embodiment, the polarizer 110 may be produced by dyeing the polymer film with iodine or dichroic dyes, followed by stretching the dyed film in the machine direction (MD). In an embodiment, the polarizer 110 may be produced through swelling, dyeing, stretching, and crosslinking.

In an embodiment, the polarizer 110 may have a total light transmittance of about 43% or more, for example, about 43% to about 50%, and a degree of polarization of about 99% or more, for example, about 99% to about 100%. Within this range, the polarizer 110 can improve anti-reflection performance of the polarizing plate through combination with the first retardation layer 120 and the second retardation layer 130.

In an embodiment, the polarizer 110 may have a thickness of about 2 μm to about 30 μm, and, in an embodiment, about 4 μm to about 25 μm. Within this range, the polarizer 110 can be used in the polarizing plate. For example, the polarizer 110 may have a thickness of about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, or about 30 μm.

In an embodiment, the protective film 140 is formed on an upper surface of the polarizer 110 to protect the polarizer from an external environment and can improve mechanical strength of the polarizing plate.

The protective film 140 serves to protect the polarizer from an external environment and may be an optically transparent film formed of, for example, at least one resin selected from among cellulose resins including triacetylcellulose (TAC) and the like, polyester resins including polyethylene terephthalate (PET), polybutylene terephthalate, polyethylene naphthalate, polybutylene naphthalate, and the like, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. In an embodiment, the protective film may be a TAC film, or a PET film.

In an embodiment, the protective film 140 may have a thickness of about 5 μm to about 70 μm, and, in an embodiment, about 15 μm to about 45 μm. Within this range, the protective film 140 can be used in the polarizing plate.

Although not shown in FIG. 1, a functional coating layer may be further formed on an upper surface of the protective film 140 to provide additional functions to the polarizing plate. For example, the functional coating layer may include any of a hard coating layer, an anti-fingerprint layer, and an anti-reflection layer. These functional coating layers may be stacked alone or in combination thereof. In an embodiment, the protective film 140 may be attached to the polarizer 110 via a bonding layer. The bonding layer may be formed of a water-based or UV curable bonding agent, without being limited thereto.

Next, a polarizing plate according to another embodiment of the present invention will be described.

In a polarizing plate according to another embodiment, a polarizer, a first retardation layer, and a second retardation layer may be sequentially stacked on a lower surface of a protective film, as described above, and a primer layer may be formed on a lower surface of the first retardation layer. In an embodiment, the primer layer is directly formed on the first retardation layer and the second retardation layer.

The primer layer directly formed on the lower surface of the first retardation layer allows the second retardation layer to exhibit high adhesion to the first retardation layer and can prevent or substantially prevent the first retardation layer from being blocked in a roll-to-roll process, thereby facilitating formation of a laminate of the first retardation layer and the second retardation layer. In particular, when the first retardation layer is a cyclic polyolefin film, which can be blocked, making it difficult to form the second retardation layer thereon by the roll-to-roll process, formation of the primer layer on the first retardation layer can improve processability upon formation of the second retardation layer.

Now, the primer layer will be described in further detail.

In an embodiment, the primer layer contains particles. Adjustment in size of the particles in the primer layer can improve adhesion of the second retardation layer to the first retardation layer and processability upon formation of the laminate of the first retardation layer and the second retardation layer.

In an embodiment, an average particle diameter (D50) of the particles is smaller than the thickness of the primer layer and may be in a range, for example, from about 1 nm to 500 nm, and, in an embodiment, about 100 nm to 300 nm. Within this range, the primer layer can prevent or substantially prevent the first retardation layer from being blocked and can improve adhesion of the second retardation layer to the first retardation layer. The particles may have a spherical or non-spherical shape, without limitation. In an embodiment, the particles have a spherical shape. The particles may include at least one of silicon oxide (for example, silica) and titanium oxide (for example, $TiO_2$), without being limited thereto.

In an embodiment, the particles may be present in an amount of about 10 wt % to about 50 wt %, and, in an embodiment, about 10 wt % to about 30 wt %, in the primer layer. Within this range, the primer layer can prevent or substantially prevent the first retardation layer from being blocked upon winding the first retardation layer onto a roll and can improve adhesion between the first retardation layer and the second retardation layer. For example, the particles may be present in an amount of about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, or about 50 wt % in the primer layer.

The primer layer may be formed by coating a composition including the particles and a curable resin, followed by curing. The curable resin may include at least one of a thermosetting resin and a photocurable resin, without being limited thereto. For example, the curable resin may include modified or non-modified acrylic, or modified or non-modified olefin resins, such as ethylene, and propylene resins, without being limited thereto.

In an embodiment, the primer layer may have a thickness of about 100 nm to about 500 nm, and, in an embodiment, about 150 nm to about 300 nm, which is greater than the average particle diameter of the particles. Within this range, the primer layer can prevent or substantially prevent blocking of the first retardation layer, can increase adhesion of the second retardation layer, and can allow reduction in thickness of the polarizing plate.

In another embodiment, the polarizing plate may further include a third retardation layer stacked on the lower surface of the polarizer.

The third retardation layer may be interposed between the polarizer and the first retardation layer, between the first retardation layer and the second retardation layer, or on a lower surface of the second retardation layer, and, in an embodiment, between the polarizer and the first retardation layer.

The third retardation layer may be stacked via an adhesive and/or a bonding agent, or may be directly stacked without an adhesive and/or a bonding agent.

In an embodiment, the third retardation layer may include a positive C retardation layer. For example, the third retardation layer may be a positive C retardation layer.

The positive C retardation layer refers to a retardation layer satisfying Relation: $nz>nx \approx ny$ ($nx$, $ny$, and $nz$ are indices of refraction of the positive C retardation layer at a wavelength of 550 nm in a slow direction, a fast direction, and a thickness direction thereof, respectively), and may have an out-of-plane retardation of about −150 nm to about 0 nm at a wavelength of 550 nm. In an embodiment, the positive C retardation layer may have an out-of-plane retardation of about −150 nm to about −10 nm, and, in an embodiment, about −150 nm to about −50 nm. Within these ranges, the positive C retardation layer can further improve the effects of the present invention. For example, the positive C retardation layer may have an out-of-plane retardation of about −150 nm, about −145 nm, about −140 nm, about −135 nm, about-130 nm, about −125 nm, about −120 nm, about −115 nm, about −110 nm, about −105 nm, about −100 nm, about −95 nm, about −90 nm, about −85 nm, about −80 nm, about −75 nm, about −70 nm, about −65 nm, about −60 nm, about −55 nm, about −50 nm, about −45 nm, about −40 nm, about −35 nm, about −30 nm, about −25 nm, about −20 nm, about −15 nm, about −10 nm, about −5 nm, or about 0 nm, at a wavelength of 550 nm.

In an embodiment, the positive C retardation layer may have an in-plane retardation of about 0 nm to about 10 nm, and, in an embodiment, about 0 nm to about 5 nm, at a wavelength of 550 nm. Within this range, the positive C retardation layer can further improve the effects of the present invention. For example, the positive C retardation layer may have an in-plane retardation of about 0 nm, about 1 nm, about 2 nm, about 3 nm, about 4 nm, about 5 nm, about 6 nm, about 7 nm, about 8 nm, about 9 nm, or about 10 nm, at a wavelength of 550 nm.

The positive C retardation layer may be a stretched film or a coating layer so long as the positive C retardation layer can realize phase retardation described above. The stretched film may include a film formed of a composition including polymers known to those skilled in the art, without limitation. The coating layer may be formed of a composition including at least one of a liquid crystalline compound and a polymer to facilitate the out-of-plane retardation described above.

In an embodiment, the positive C retardation layer may have a thickness of greater than about 0 μm to about 50 μm, and, in an embodiment, about 0.1 μm to about 30 μm, and, in an embodiment, about 0.1 μm to about 10 μm. Within this range, the positive C retardation layer can be used in the polarizing plate.

In an embodiment, the third retardation layer may have a thickness of greater than about 0 μm to about 70 μm, and, in an embodiment, about 5 μm to about 60 μm, and, in an embodiment, about 10 μm to about 60 μm. Within this range, the third retardation layer can be used in the polarizing plate.

An optical display apparatus according to the present invention may include a polarizing plate according to any of the embodiments of the present invention. For example, the optical display apparatus may include any of organic light emitting diode (OLED) displays and liquid crystal displays.

In an embodiment, the OLED display may include: an OLED panel including a flexible substrate; and a polarizing plate according to an embodiment of the present invention stacked on the OLED panel.

In another embodiment, the OLED display may include: an OLED panel including a non-flexible substrate; and a polarizing plate according to an embodiment of the present invention stacked on the OLED panel.

Next, the present invention will be described in further detail with reference to some examples. However, it should be noted that these examples are provided for illustration only and should not be construed in any way as limiting the invention.

Example 1

A polyvinyl alcohol film (PS #60, Kuraray Co., Ltd., Japan, pre-stretching thickness: 60 μm) was stretched to 6 times an original length thereof in an aqueous solution of iodine at 55° C., thereby preparing a polarizer having a transmittance of 45%.

A first retardation layer (positive wavelength dispersion, short wavelength dispersion: 1.005, long wavelength dispersion: 0.995, Re at 550 nm: 190 nm, Rth at 550 nm: 115 nm) was prepared by obliquely stretching a cyclic polyolefin film (ZD film, Zeon Corporation) at an angle of 50°. A primer layer was formed on a lower surface of the first retardation layer using a composition [prepared by mixing silica particles having an average particle diameter of 300 nm with a mixture of a modified propylene resin and an acrylic resin (content of the silica particles in the primer layer: 10 wt %, thickness of the primer layer: 500 nm)].

A second retardation layer composition (including a halogen-containing cellulose acetate polymer) was coated to a predetermined thickness on a lower surface of the primer layer, followed by drying a solvent. Then, the coating layer was obliquely stretched 1.2 times at an angle of +7° with respect to the MD of the first retardation layer at 140° C., thereby forming a laminate in which a second retardation layer having specifications shown in Table 1 was formed on the lower surface of the first retardation layer.

Then, a polarizing plate was fabricated by sequentially attaching the prepared polarizer and a triacetylcellulose film as a protective film to the upper surface of the first retardation layer in the sequence of the protective film, the polarizer, the first retardation layer and the second retardation layer. Angles between the aforementioned axes of the polarizing plate are shown in Table 1.

Examples 2 and 3

Polarizing plates were fabricated in the same manner as in Example 1 except that the retardation, thickness, and wavelength dispersion of the second retardation layer and Angles 1 and 2 were changed as listed in Table 1. Here, the second retardation layer was formed of the same material as in Example 1.

Comparative Examples 1 to 4

Polarizing plates were fabricated in the same manner as in Example 1 except that the retardation, thickness, and wavelength dispersion of the second retardation layer and Angles 1 and 2 were changed as listed in Table 1. Here, the second retardation layer was formed of the same material as in Example 1.

Comparative Example 5

A polarizing plate was fabricated in the same manner as in Example 1 except that the wavelength dispersion of the second retardation layer was changed by adding 2-naphthyl benzoate as an additive to the second retardation layer.

The retardation, Re, Rth, and NZ of each of the first and second retardation layers were measured using an Axoscan polarimeter (AxoMetric Co., Ltd.).

Each of the polarizing plates fabricated in the Examples and Comparative Examples was evaluated as to the following properties. Results are shown in Table 1.

(1) Degree of circular polarization (%): The degree of circular polarization was measured by forcing light through the polarizing plate from the front side (0°) using an Axoscan polarimeter (AxoMetric Co., Ltd., U.S.). Then, the degree of circular polarization was measured by forcing light through the polarizing plate from the lateral side (60°)

while rotating the polarimeter 360 degrees. Measured values of the degree of lateral circular polarization are shown in Table 1.

(2) Reflectivity (unit: %): Reflectivity was measured using a goniometer (DMS 803, Instrument Systems Inc. (Konica Minolta group), Japan). After measurement with respect to a white plate provided to the goniometer, luminance and contrast were measured using an angular scanning function. Each of the polarizing plates fabricated in the Examples and Comparative Examples was attached to a panel (glass substrate) via a pressure-sensitive adhesive, followed by measurement of front and lateral reflectivity of the polarizing plate. Here, theta was measured at intervals of 5° and reflectivity was determined by obtaining spectral transmittance/reflectance (SCE) values for incident light from the front side (0°) and the lateral side (60°).

(3) Light resistance (unit: nm): A laminate of the first retardation layer and the second retardation layer (including the primer layer between the first retardation layer and the second retardation layer) was separated from each of the polarizing plates fabricated in the Examples and Comparative Examples and was evaluated as to light resistance. Specifically, Rth of the laminate of the first retardation layer and the second retardation layer was measured at a wavelength of 550 nm using an Axoscan polarimeter (AxoMetric Co., Ltd.). Then, Rth of the laminate of the first retardation layer and the second retardation layer was measured at a wavelength of 550 nm in the same manner as above after irradiating the laminate from the side of the second retardation layer with UVA (wavelength: 360 nm) at a fluence of 720 mJ/cm² for 120 hours using an exposure machine (Q-SUN Xe-1 model, Q-LAB Corporation). A variance in out-of-plane retardation ($\Delta Rth$) was calculated by the following Equation 1:

$$\Delta Rth = |Rth(0\ hr) - Rth(120\ hr)|, \quad \text{Equation 1}$$

where, in Equation 1, Rth(0 hr) denotes an absolute value (unit: nm) of initial Rth of the laminate of the first retardation layer and the second retardation layer at a wavelength of 550 nm; and Rth(120 hr) denotes an absolute value (unit: nm) of Rth of the laminate of the first retardation layer and the second retardation layer at a wavelength of 550 nm, as measured after irradiation of the laminate of the first retardation layer and the second retardation layer with light having a wavelength of 360 nm at a fluence of 720 mJ/cm² for 120 hours.

(4) Detachment: Detachment of the second retardation layer from the first retardation layer was evaluated. First, 10 vertical lines and 10 horizontal lines were drawn on the laminate of the first retardation layer and the second retardation layer separated from each of the polarizing plates fabricated in the Examples and Comparative Examples to divide the laminate into a total of 100 pieces. An adhesive tape was attached to the second retardation layer, followed by observing whether the second retardation layer was detached from the laminate upon peeling the adhesive tape off of the second retardation layer. When no pieces of the second retardation layer were detached from the laminate, a corresponding specimen was rated as OK, and, when any of the pieces was detached from the laminate, a corresponding specimen was rated as NG.

TABLE 1

| | | Example | | | Comparative Example | | | | |
|---|---|---|---|---|---|---|---|---|---|
| | | 1 | 2 | 3 | 1 | 2 | 3 | 4 | 5 |
| First retardation layer | Re(nm) | 200 | 200 | 200 | 150 | 240 | 200 | 200 | 200 |
| | Short wavelength dispersion | 1.005 | 1.005 | 1.005 | 1.005 | 1.005 | 1.005 | 1.005 | 1.005 |
| | Long wavelength dispersion | 0.998 | 0.998 | 0.998 | 0.998 | 0.998 | 0.998 | 0.998 | 0.998 |
| Second retardation layer | Re (nm) | 90 | 90 | 110 | 90 | 90 | 140 | 40 | 100 |
| | Rth (nm) | −63 | −85.5 | −110 | −63 | −63 | −126 | −36 | −70 |
| | Thickness (μm) | 3.3 | 3.2 | 4.4 | 3.3 | 3.3 | 3.8 | 3.0 | 5.8 |
| | NZ | −0.2 | −0.45 | −0.5 | −0.2 | −0.2 | −0.4 | −0.4 | −0.2 |
| | Rth/d (nm/μm) | −19.1 | −26.7 | −25 | −19.1 | −19.1 | −33.2 | −12 | −12.1 |
| | Short wavelength dispersion | 1.05 | 1.05 | 1.05 | 1.05 | 1.05 | 1.05 | 1.05 | 1.12 |
| | Long wavelength dispersion | 0.97 | 0.97 | 0.97 | 0.97 | 0.97 | 0.97 | 0.97 | 0.95 |
| | Angle 1 (°) | +68 | +68 | +69 | +68 | +68 | +68 | +68 | +69.5 |
| | Angle 2 (°) | +7 | +7 | +7.5 | +7 | +7 | +7 | +7 | +6.5 |
| Degree of circular polarization (min value) | Lateral | 73 | 73 | 72 | 46 | 55 | 55 | 33 | 65 |
| Reflectivity | Front | 0.24 | 0.23 | 0.23 | 1 | 0.8 | 0.92 | 0.83 | 0.27 |
| | Lateral | 2.28 | 2.65 | 2.65 | 10.2 | 8.7 | 6.2 | 7.2 | 4.2 |
| Light resistance reliability | | 1 | 0.8 | 0.5 | 1 | 1 | 1.2 | 0.4 | 15 |
| Detachment | | OK | OK | OK | OK | OK | OK | OK | NG |

\* Angle 1: An angle formed by the slow axis of the first retardation layer and the transmission axis of the polarizer.
\* Angle 2: An angle formed by the slow axis of the second retardation layer and the transmission axis of the polarizer As shown in Table 1, the polarizing plates according to the present invention had a significantly low front reflectivity of less than 1% and a significantly low lateral reflectivity of less than 5%, specifically 4% or less, exhibited good light resistance, and did not undergo detachment of the second retardation layer from the first retardation layer.

Conversely, the advantageous effects of the present invention could not be achieved by the polarizing plates of Comparative Examples 1 and 2, in which in-plane retardation of the second retardation layer was outside the range of 180 nm to 220 nm, the polarizing plates of Comparative Examples 3 and 4, in which Rth/d of the second retardation layer was outside the range of −33 nm/μm to −15 nm/μm and Re of the second retardation layer was outside the range of 70 nm to 120 nm, and the polarizing plate of Comparative Example 5, in which wavelength dispersion and Rth/d of the second retardation layer were outside the ranges of the present invention.

Although some embodiments have been described herein, it should be understood that various modifications, changes, alterations, and equivalent embodiments can be made by those skilled in the art without departing from the spirit and scope of the invention.

What is claimed is:

1. A polarizing plate comprising:
   a polarizer; and
   a first retardation layer and a second retardation layer sequentially stacked on a lower surface of the polarizer,
   wherein the first retardation layer has a short wavelength dispersion of about 1 to about 1.03, a long wavelength dispersion of about 0.98 to about 1, and an in-plane retardation of about 180 nm to about 220 nm at a wavelength of 550 nm,
   the second retardation layer has a short wavelength dispersion of about 1 to about 1.1, a long wavelength dispersion of about 0.96 to about 1, and an in-plane retardation of about 70 nm to about 120 nm at a wavelength of 550 nm, and
   a ratio (Rth/d) of out-of-plane retardation (Rth) (unit: nm) of the second retardation layer at a wavelength of 550 nm to thickness (d) (unit: μm) of the second retardation layer is from about −33 nm/μm to about −15 nm/μm, and
   wherein the second retardation layer is directly formed on the first retardation layer.

2. The polarizing plate according to claim 1, wherein the first retardation layer is an obliquely stretched film, and the second retardation layer is an obliquely stretched coating layer.

3. The polarizing plate according to claim 1, wherein the first retardation layer has a slow axis tilted at an angle of about +65° to about +75° or at an angle of about −65° to about −75° with reference to a transmission axis of the polarizer.

4. The polarizing plate according to claim 1, wherein the second retardation layer has an out-of-plane retardation of about −150 nm to about −50 nm at a wavelength of 550 nm.

5. The polarizing plate according to claim 1, wherein the second retardation layer has a thickness of about 2 μm to about 8 μm.

6. The polarizing plate according to claim 1, wherein an angle defined between a slow axis of the first retardation layer and a slow axis of the second retardation layer is from about 55° to about 70°.

7. The polarizing plate according to claim 1, wherein a ratio of short wavelength dispersion of the second retardation layer to short wavelength dispersion of the first retardation layer is from about 1 to about 1.08.

8. The polarizing plate according to claim 1, wherein a ratio of long wavelength dispersion of the second retardation layer to long wavelength dispersion of the first retardation layer is from about 0.96 to about 1.

9. The polarizing plate according to claim 1, wherein the first retardation layer has a degree of biaxiality of about 1 to about 1.4 at a wavelength of 550 nm, and the second retardation layer has a degree of biaxiality of about −2 to about 0 at a wavelength of 550 nm.

10. The polarizing plate according to claim 1, wherein the second retardation layer is a non-liquid crystal layer.

11. The polarizing plate according to claim 10, wherein the second retardation layer is formed of a second retardation layer composition comprising at least one of a cellulose ester and styrene, each of the cellulose ester and the styrene being substituted or unsubstituted with at least one of a halogen, a nitro group, an alkyl group, an alkenyl group, a cycloalkyl group, an aryl group, a heteroaryl group, an alkoxy group, and a halogen-containing functional group.

12. The polarizing plate according to claim 1, further comprising a primer layer on a lower surface of the first retardation layer.

13. The polarizing plate according to claim 12, wherein the primer layer comprises particles having an average particle diameter (D50) of about 1 nm to about 500 nm.

14. The polarizing plate according to claim 13, wherein the particles comprise at least one of silicon oxide and titanium oxide.

15. The polarizing plate according to claim 1, further comprising a protective layer on an upper surface of the polarizer.

16. The polarizing plate according to claim 1, further comprising a third retardation layer stacked on the lower surface of the polarizer,
   wherein the third retardation layer comprises a positive C retardation layer having an out-of-plane retardation of about −150 nm to about 0 nm at a wavelength of 550 nm.

17. An optical display apparatus comprising the polarizing plate according to claim 1.

18. A polarizing plate comprising:
   a polarizer; and
   a first retardation layer and a second retardation layer sequentially stacked on a lower surface of the polarizer,
   wherein the first retardation layer has a short wavelength dispersion of about 1 to about 1.03, a long wavelength dispersion of about 0.98 to about 1, and an in-plane retardation of about 180 nm to about 220 nm at a wavelength of 550 nm,
   the second retardation layer has a short wavelength dispersion of about 1 to about 1.1, a long wavelength dispersion of about 0.96 to about 1, and an in-plane retardation of about 70 nm to about 120 nm at a wavelength of 550 nm, and
   a ratio (Rth/d) of out-of-plane retardation (Rth) (unit: nm) of the second retardation layer at a wavelength of 550 nm to thickness (d) (unit: μm) of the second retardation layer is from about −33 nm/μm to about −15 nm/μm, and
   wherein a laminate of the first retardation layer and the second retardation layer has a variation in out-of-plane retardation (ΔrRth) of about 10 nm or less, as calculated by the following Equation 1:

$$\Delta rRth = |Rth(0 \text{ hr}) - Rth(120 \text{ hr})|,$$

where, in Equation 1, Rth(0 hr) denotes an absolute value (unit: nm) of initial Rth of the laminate of the first retardation layer and the second retardation layer at a wavelength of 550 nm, and Rth(120 hr) denotes an absolute value (unit: nm) of Rth of the laminate of the first retardation layer and the second retardation layer at a wavelength of 550 nm, as measured after irradiation of the laminate of the first retardation layer and the second retardation layer with light having a wavelength of 360 nm at a fluence of 720 mJ/cm² for 120 hours.

19. A polarizing plate comprising:

a polarizer; and a first retardation layer and a second retardation layer sequentially stacked on a lower surface of the polarizer, wherein the first retardation layer has a short wavelength dispersion of about 1 to about 1.03, a long wavelength dispersion of about 0.98 to about 1, and an in-plane retardation of about 180 nm to about 220 nm at a wavelength of 550 nm, the second retardation layer has a short wavelength dispersion of about 1 to about 1.1, a long wavelength dispersion of about 0.96 to about 1, and an in-plane retardation of about 70 nm to about 120 nm at a wavelength of 550 nm, and a ratio (Rth/d) of out-of-plane retardation (Rth) (unit: nm) of the second retardation layer at a wavelength of 550 nm to thickness (d) (unit: μm) of the second retardation layer is from about −33 nm/μm to about −15 nm/μm, and wherein the second retardation layer has a slow axis tilted at an angle of about +5° to about +10° or at an angle of about −5° to about −10° with reference to a transmission axis of the polarizer.

\* \* \* \* \*